(12) United States Patent
Millius

(10) Patent No.: US 10,100,938 B2
(45) Date of Patent: Oct. 16, 2018

(54) VARIABLE FLOW GAS VALVE AND METHOD FOR CONTROLLING SAME

(75) Inventor: Michael J. Millius, South Elgin, IL (US)

(73) Assignee: ROBERTSHAW CONTROLS COMPANY, Itasca, IL (US)

( * ) Notice: Subject to any disclaimer, the term of this patent is extended or adjusted under 35 U.S.C. 154(b) by 3025 days.

(21) Appl. No.: 12/329,749

(22) Filed: Dec. 8, 2008

(65) Prior Publication Data

US 2010/0140520 A1    Jun. 10, 2010

(51) Int. Cl.
| F16K 3/32 | (2006.01) |
| F16K 3/34 | (2006.01) |
| F16K 31/06 | (2006.01) |

(52) U.S. Cl.
CPC ............... *F16K 3/32* (2013.01); *F16K 3/34* (2013.01); *F16K 31/0675* (2013.01); *Y10T 137/0318* (2015.04)

(58) Field of Classification Search
USPC .................................................. 137/624.15
See application file for complete search history.

(56) References Cited

U.S. PATENT DOCUMENTS

| 3,115,896 | A | * | 12/1963 | Roberts et al. | .......... 137/625.41 |
| 3,843,049 | A | | 10/1974 | Baysinger | |
| 4,313,465 | A | * | 2/1982 | Holzem et al. | .......... 137/599.07 |
| 4,323,342 | A | | 4/1982 | Sommers, Jr. et al. | |
| 4,342,443 | A | * | 8/1982 | Wakeman | ................ 251/129.08 |
| 4,546,795 | A | * | 10/1985 | Okamoto et al. | ........ 137/624.15 |
| 4,590,970 | A | * | 5/1986 | Mott | .............................. 137/828 |
| 4,951,468 | A | * | 8/1990 | Sasajima et al. | ............... 60/487 |
| 4,997,161 | A | | 3/1991 | Hutchison et al. | |
| 5,241,463 | A | | 8/1993 | Lee | |
| 5,310,110 | A | | 5/1994 | Akamatsu et al. | |
| 5,458,294 | A | | 10/1995 | Zachary et al. | |
| 5,575,638 | A | * | 11/1996 | Witham et al. | ................. 431/73 |
| 5,924,857 | A | | 7/1999 | Frasnetti et al. | |
| 5,945,929 | A | | 8/1999 | Westra | |
| 5,977,694 | A | | 11/1999 | McGuire | |
| 5,981,916 | A | | 11/1999 | Griffiths et al. | |

(Continued)

FOREIGN PATENT DOCUMENTS

| EP | 0062856 A1 | 10/1982 |
| EP | 0585478 A1 | 3/1994 |

(Continued)

*Primary Examiner* — John Fox
(74) *Attorney, Agent, or Firm* — Reinhart Boerner Van Deuren P.C.

(57) ABSTRACT

A gas control valve and method of controlling a gas control valve to provide infinite adjustability is provided. The gas control valve defines a fluid flow path. A flow adjustment arrangement within the fluid flow path has a plurality of discrete open configurations. Each discrete open configuration establishes a different flow rate through the fluid flow path. A controller operatively cyclically alternates the flow adjustment arrangement between different ones of the discrete configurations to provide an average flow rate through the fluid flow path that is between the flow rates permitted by the different ones of the discrete open configurations. The controller establishes residence times at the various ones of the discrete open configurations such that the resultant flow rate is the desired flow rate.

2 Claims, 10 Drawing Sheets

(56) References Cited

U.S. PATENT DOCUMENTS

| | | |
|---|---|---|
| 6,003,544 A | 12/1999 | Turrin et al. |
| 6,069,783 A * | 5/2000 | Mount et al. ............... 361/154 |
| 6,116,230 A | 9/2000 | Clifford et al. |
| 6,198,080 B1 | 3/2001 | Rice et al. |
| 6,809,301 B1 | 10/2004 | McIntyre et al. |
| 7,022,949 B2 | 4/2006 | Shukla |
| 7,045,748 B2 | 5/2006 | Blackson et al. |
| 7,151,968 B2 | 12/2006 | Williamson |
| 2002/0045142 A1* | 4/2002 | Repper et al. ............... 431/66 |
| 2003/0226560 A1 | 12/2003 | Shekarri |
| 2004/0069293 A1 | 4/2004 | Steurer |
| 2004/0191711 A1* | 9/2004 | Watson et al. ............... 431/12 |
| 2005/0257785 A1 | 11/2005 | Gama et al. |
| 2006/0278285 A1 | 12/2006 | Shukmin et al. |

FOREIGN PATENT DOCUMENTS

| | | |
|---|---|---|
| GB | 589873 | 7/1947 |
| GB | 1366339 | 9/1974 |
| JP | 56145410 A | 11/1981 |

\* cited by examiner

VARIABLE FLOW GAS VALVE AND METHOD FOR CONTROLLING SAME

FIELD OF THE INVENTION

This invention generally relates to gas valves and more particularly to variable flow gas valves.

BACKGROUND OF THE INVENTION

Gas valves for controlling gas flow in appliances are well known. Further, variable flow gas valves that permit variable flows are known. Variable flow gas valves allow a user to adjust the flow of gas to adjust the temperature of a connected burner. For example, in an oven or a range, cooks routinely adjust the cooking temperature of the appliance depending on the object being cooked or the desired method of cooking. The cook adjusts the desired cooking temperature by operably adjusting the flow of gas allowed to the burner by operably adjusting the variable flow gas valve. Typically, this is done by turning a knob or adjusting a temperature setting for an electronic control system for the gas valve to signal the desired cooking temperature.

Numerous gas valve arrangements and methods of controlling the gas valve arrangements to adjust gas flow through the gas valve have been used in the past. Some gas valves use discrete settings that provide finite incremental adjustments to the gas flow depending on the configuration of the gas valve.

One particular example of this valve arrangement is illustrated in U.S. patent application Ser. No. 11/507,107 entitled "Variable Flow Valve," filed Aug. 21, 2006, and having U.S. Pat. Publ. No. 2006/0278285, the teachings and disclosures of which are incorporated by reference herein in their entirety. This valve is adjustable between a few finite positions such that the valve will provide a discrete number of flow rates therethrough and coincidentally a discrete number of cooking temperatures for a corresponding attached burner. The valve includes a plurality of solenoids that drive the valve member to a plurality of different positions. The discrete flow rates are provided by aggregating the number of open apertures in the valve member or selecting apertures in the valve that have progressively larger openings. However, because the valve only has discrete positions, the prior art valve does not have infinite adjustability between the discrete positions and their corresponding flow rates.

Other gas valves attempt to provide for more infinite adjustability by providing a tapered valve member that inter-acts with a cooperating valve seat. The valve adjusts the flow rate therethrough by moving the tapered valve member toward and away from the valve seat. When the valve member moves towards the valve seat, the opening therebetween becomes smaller restricting flow and reducing the flow rate. Similarly, when the valve member moves away from the valve seat, the opening therebetween becomes larger allowing for increased flow therethrough. Thus, flow rates can be infinitely adjusted between maximum and minimum flow rates by infinitely adjusting the position of the valve member between a maximum flow rate position and a minimum flow rate position. However, as there has been a move toward electronic control of gas valves using solenoid drive devices, providing for this infinite adjustment has been difficult if not impossible because solenoids typically provide discrete amounts of movement.

Some valves have utilized a solenoid to drive the valve member against a biasing means, typically a spring, and have adjusted the amount of current through the solenoid to adjust the force the valve member applies against the spring to adjust the position of the valve member.

The present invention relates to improvements over the current state of the gas valve art.

BRIEF SUMMARY OF THE INVENTION

Implementations of the present invention relate to controlling a gas control valve that provides for only discrete open configurations without adjustment between those discrete open configurations such that the valve is infinitely adjustable between those discrete open configurations. More particularly, the present invention relates to methods and valves that cyclically oscillate between various ones of the discrete open configurations at varying rates to establish an average flow rate that is a combination of the two bounding discrete open configurations.

In one particular form of the invention a gas control valve including a housing, a fluid flow path, a flow adjustment arrangement and a controller is provided. The housing has an inlet port and an outlet port. The fluid flow path extends between the inlet port and the outlet port. The flow adjustment arrangement is within the fluid flow path and has a plurality of discrete open configurations. Each discrete open configuration establishes a different flow rate through the fluid flow path. The controller operatively couples to the flow adjustment arrangement to switch the flow adjustment arrangement between the discrete open configurations. The controller cyclically alternates the flow adjustment arrangement between different ones of the discrete configurations providing an average flow rate through the fluid flow path that is between the unique flow rates permitted by the different ones of the discrete open configurations.

In one embodiment, the flow adjustment arrangement includes at least one valve member that cooperates with the housing to define the discrete open configurations. The flow adjustment arrangement also includes a stepper motor operably driving the valve member between the discrete configurations. In further embodiments, the stepper motor includes at least one solenoid arrangement that is selectively energized and de-energized by the controller to drive the at least one valve member between the discrete open configurations.

The gas control valve of some implementations of the present invention includes a selector for establishing a user desired flow rate. The selector includes a discrete open configuration indicator for each one of the plurality of discrete open configurations. The selector positionable at or between the discrete open configuration indicators. When the selector aligns with one of discrete open configuration indicators, the controller maintains the flow adjustment arrangement in the selected discrete open configuration. When the selector is aligned between two discrete open configurations, the controller cyclically alternates the flow adjustment arrangement between the two discrete open configurations.

In more particular embodiments, when the selector is aligned between the two discrete open configurations, the controller establishes a residence time for each of the two discrete open configurations that the selector is between. The spacing of the selector from each of the two discrete open configuration indicators determines the residence time. The closer the selector is to a discrete open configuration (i.e. a shorter distance) the greater residence time at that discrete open configuration. Thus, the spacing between the selector and the nearest discrete open configuration indicator is inversely proportional to the residence time for that discrete open configuration, said residence time being established by the controller.

The selector, in one embodiment, is digital and the distance is a digital representation of a distance.

In yet another form, the invention provides a method of controlling a variable gas control valve. The gas control valve has a first discrete open configuration providing a first flow rate and a second discrete open configuration providing a second flow rate, different than the first flow rate. The method includes continuously cycling between the first and second discrete open configurations to provide a desired average output flow rate that is different than the first and second flow rates.

In a preferred method, the invention includes performing a warm up sequence prior to controlling the valve to provide the desired average output flow rate. The warm up sequence permits a large flow rate than would be provided for the desired average output flow rate to rapidly heat a device to the desired temperature. Then, the controller backs down the flow rate to the desired average output flow rate once sufficient heating of a device, such as a pan, has occurred. At that time, the valve is normally operated to maintain the desired average output flow rate.

In another embodiment, a method includes cycling between a discrete open configuration and an off configuration, while providing an average flow rate sufficient to prevent extinguishing a flame of a device (i.e. a burner) coupled to the valve.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
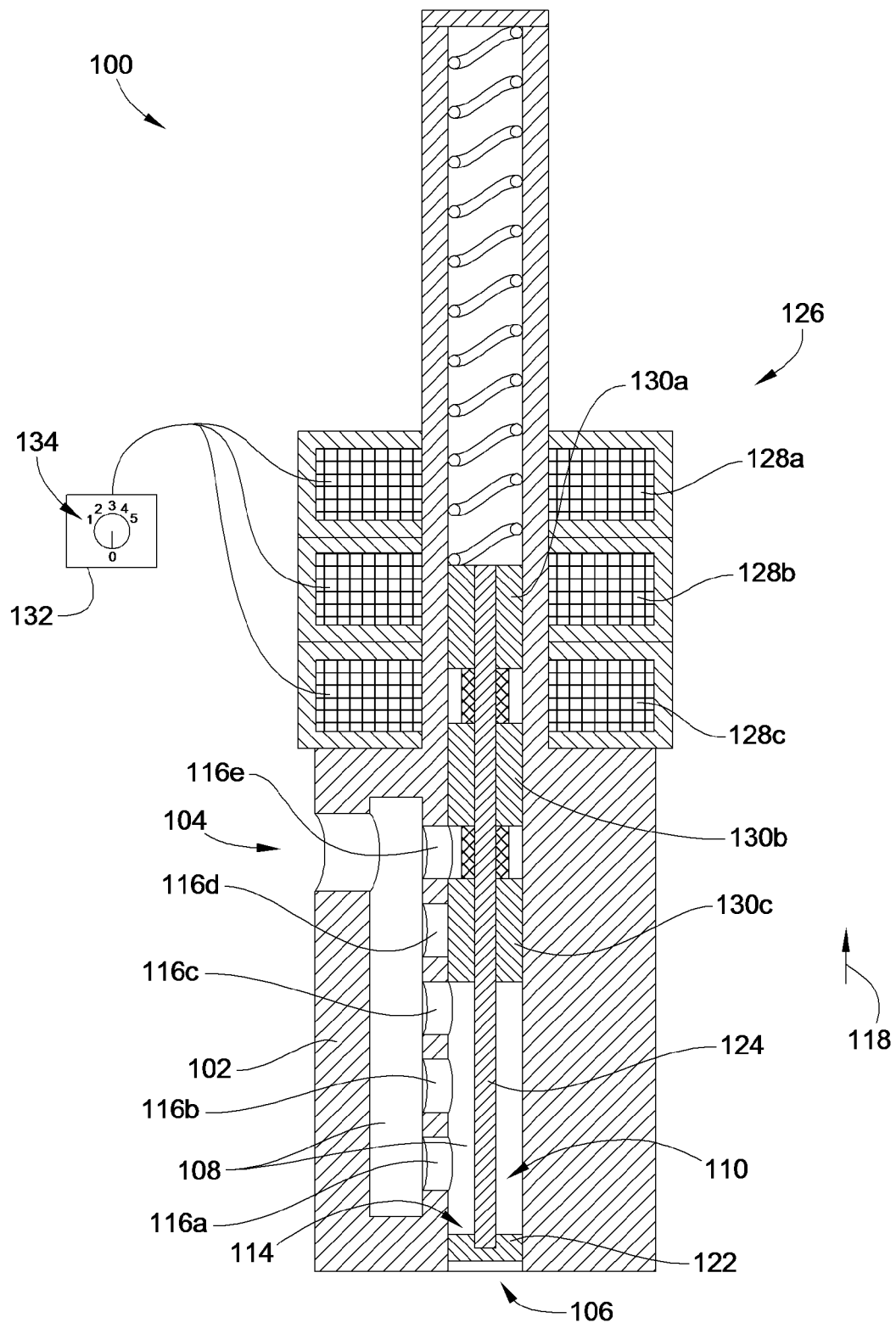
FIG. 1 is a simplified cross-sectional illustration of a gas control valve according to the teachings of the present invention in a closed orientation.
Figure 6:
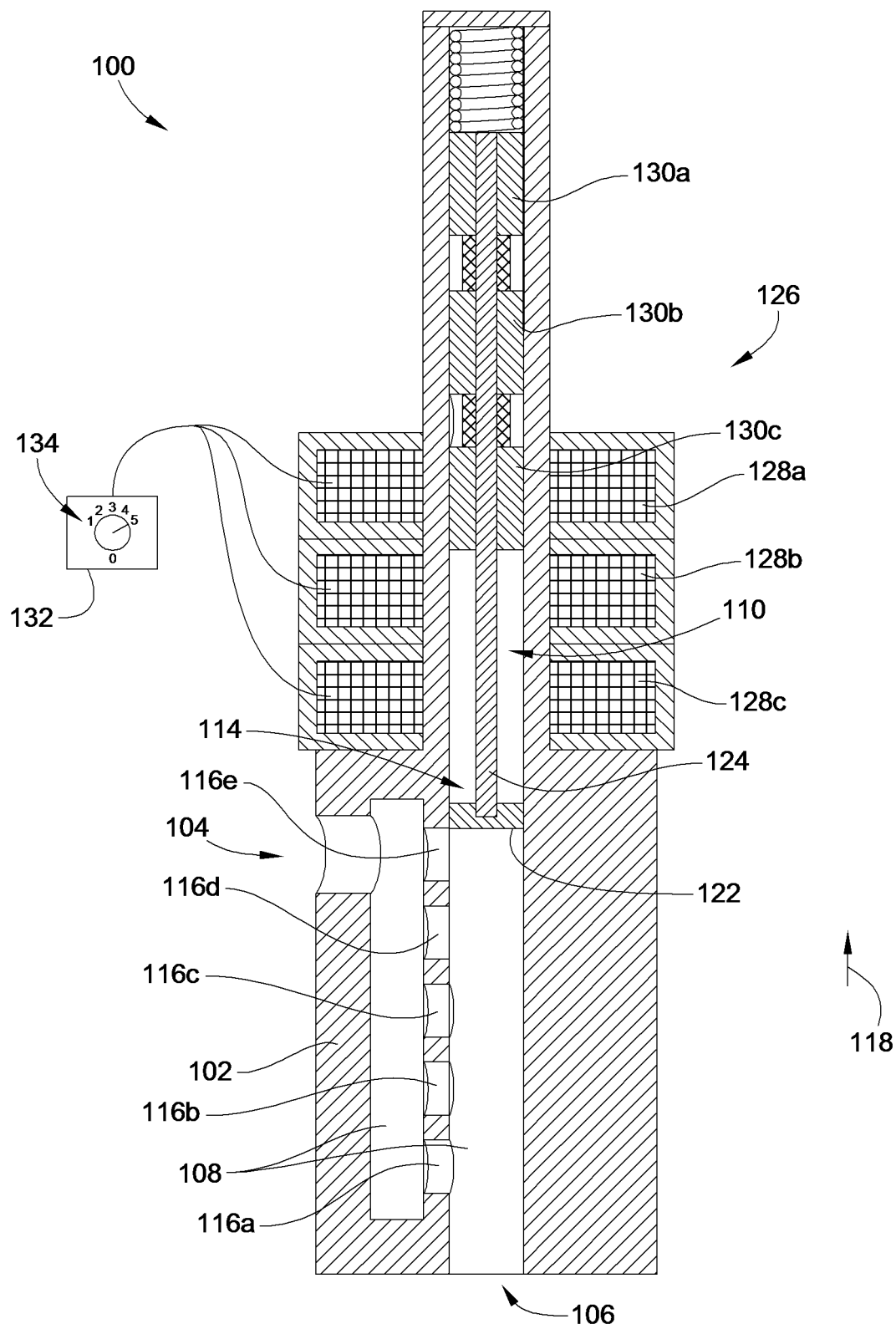
Figure 7:
FIG. 7 is a graph of the discrete unique flow rates for each of the discrete open configurations of FIGS. 2-6 based on various selector positions of the control valve.

FIG. 1 illustrates a simplified illustration of one embodiment of a gas valve 100 for use in practicing the present invention. The gas valve 100 is a variable flow valve that provides five discrete open configurations (see FIGS. 2-6) in which fluid flow may pass through the gas valve 100. Each of the five discrete open configurations provides a different flow rate. As illustrated in FIG. 7, the five discrete open configurations provide flow rates, illustrated as BTU flow rate, between 12,000 BTU for discrete open configuration 1 to 16,000 BTU for discrete open configuration 5. Other valve configurations can be provided with different flow rate ranges as well as with more or less discrete open configurations.

In the illustrated embodiment, the lowest discrete open configuration, discrete open configuration 1 is the lowest flow rate that can maintain a flame for an attached burner and will be considered a low gas flow level. Discrete open configuration 5 is the maximum flow rate permitted by the valve and is considered the maximum gas flow level.

Embodiments of the present invention facilitate infinite adjustment of the flow rate through the gas valve 100 between the discrete open configurations including and above the low gas flow level and are not limited only to producing the five discrete flow rates illustrated in FIG. 7. This is unlike previous implementations of valves that utilize discrete open configurations, which only permitted those discrete flow rates with limited or no variation between those discrete flow rates. Thus, valves according to embodiments of the present invention can be configured and operated to provide infinite adjustability between the discrete configurations. For example, discrete open configuration 1 provides a BTU flow rate of 12,000 BTU while discrete open configuration 2 provides a BTU flow rate of 13,000 BTU, however, the valve 100 can be operated, as will be more fully discussed below, at any range between 12,000 BTU and 13,000 BTU such as at 12,750 BTU.

As used herein a "discrete open configuration" is a configuration that is reached when all parts of the valve are in a stopped position. Further, valves having "discrete open configurations" provide discontinuous flow rate adjustment from one configuration to the next. The transitioning of the valve from one discrete open configuration providing a first fluid flow rate to the next discrete open configuration providing a second fluid flow rate will result in a discontinuous change in flow rate. Valves that have discrete open configurations, without further control, cannot be varied to fixed positions such that flow rates that are between the flow rates can be provided by the valve. This is illustrated by the graph in FIG. 7 in which there is a discrete jump in the BTU flow rate between each of the five discrete open configurations that are provided for the gas valve of FIG. 1.

Thus, a valve that includes a cooperating valve seat and valve member arrangement and an actuator for adjusting the position of the valve member relative to the valve seat that can infinitely adjust a fixed position of the valve member relative to the valve seat so as to infinitely adjust the flow rate through the valve between maximum and minimum flow rates is one example of a valve that is not a valve that includes discrete open configurations. One particular valve is a valve that is configured to produce a pulsed signal controlling an actuator of the valve to maintain the valve member in a substantially fixed position but can infinitely adjust the fixed position of the valve member by modifying the pulsed signal to the actuator.

However, if the valve member were configured such that the actuator could infinitely adjust the position of the valve member relative to the valve seat, thus eliminating the infinite adjustability between maximum and minimum flow rates, the valve would include discrete open configurations.

With primary reference to FIG. 1, the gas valve 100 generally includes a housing 102 having an inlet port 104 and an outlet port 106. A fluid flow path 108 extends through the housing 102 and connects the inlet port 104 to the outlet port 106. A flow adjustment arrangement 110 within the fluid flow path 108 establishes the plurality of discrete open configurations (see discrete open configurations 1 through 5 illustrated in FIGS. 2-6, respectively) for the gas valve 100. Each discrete open configuration adjusts the fluid flow path to provide a unique flow rate therethrough.

A transition from one discrete open configuration to another discrete open configuration results in a generally discontinuous change in flow rate. One of ordinary skill will recognize that the discontinuous transitions refer to discontinuous jumps between quiescent states. Thus, there will be a slight lag time between attaining the discrete flow rate of a given discrete open configuration and that "discontinuous" is only a theoretical discontinuity. In other words, the flow rate change will not be a perfect stepped profile (as illustrated in FIG. 7, but will have a smoothing effect as the valve transitions between various ones of the discrete open configurations. However, this slight lag or smoothing shall be considered minimal and such different configurations shall be considered discrete open configurations with discontinuous jumps therebetween.

The flow adjustment arrangement 110 acts to adjust the size of the fluid flow path 108 therethrough. In the embodiment of FIG. 1, the flow adjustment arrangement 110 includes a valve member 114 that interacts with an array of flow adjustment ports 116a-e. The valve member 114 operatively adjusts which flow adjustment ports 116a-e are within the fluid flow path 108 through the flow adjustment arrangement 110 to adjust the amount of fluid flow permitted therethrough. In this embodiment, as the valve member 114 opens, by moving away from outlet port 106 as illustrated by arrow 118, the valve member 114 aggregates the number of flow adjustment ports 116a-e that are positioned within the fluid flow path 108, thereby increasing the amount of fluid flow permitted through the flow adjustment arrangement, and ultimately through gas valve 100.

More particularly, valve member 114 includes a plunger 122 connected to a valve stem 124. The plunger 122 is the portion of the valve member 114 that selectively determines which flow adjustment ports 116a-e will be open or closed.

Figure 2:
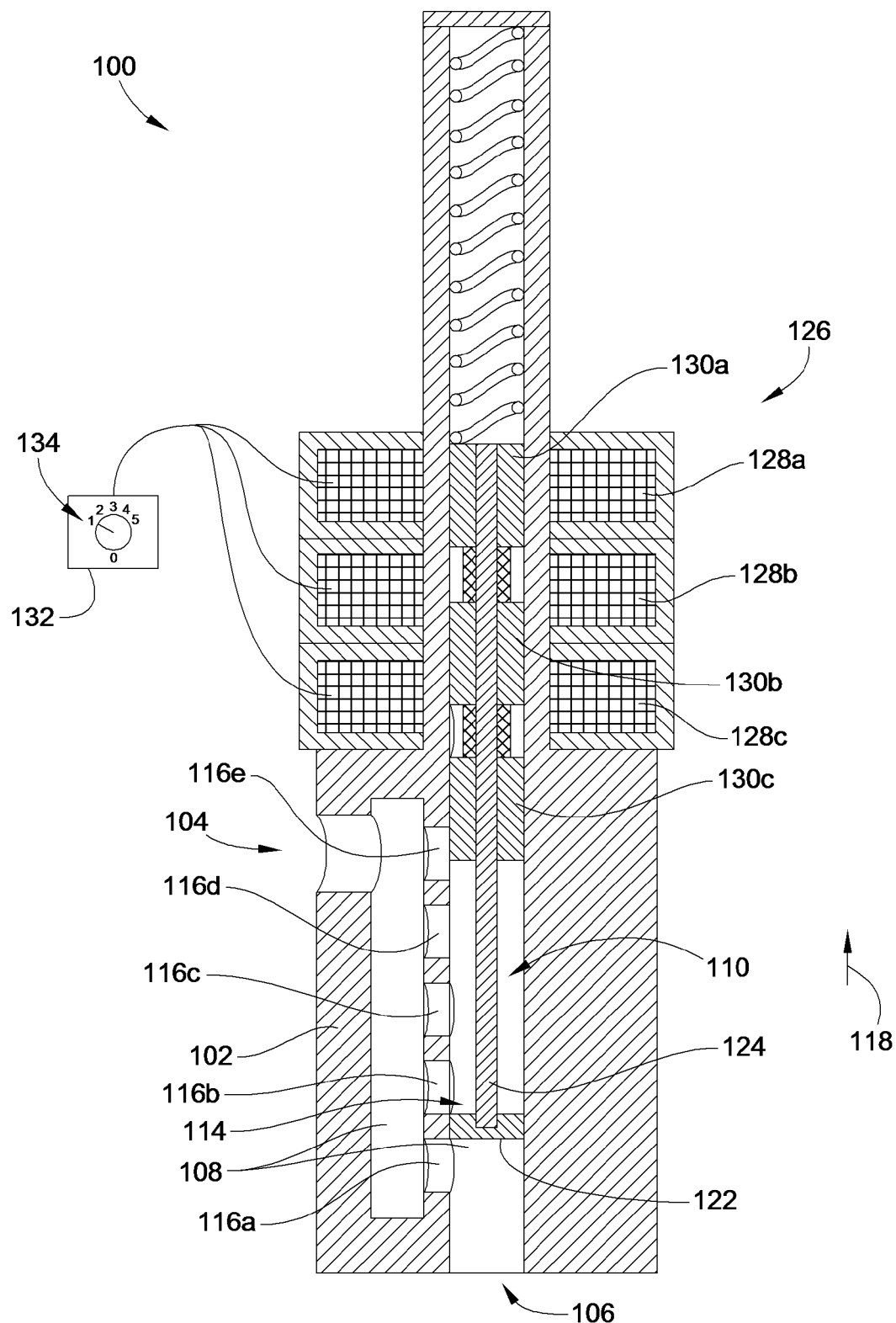
FIGS. 2-6 are simplified cross-sectional illustrations of the gas control valve in various discrete open configurations.

In a discrete open configuration 1 only flow adjustment port 116a is open (see FIG. 2). When the valve member 114 is transitioned to discrete open configuration 2 (see FIG. 3), flow adjustment port 116b is additionally opened such that both flow adjustment port 116a and flow adjustment port 116b are open forming part of fluid flow path 108. When the valve member 114 transitioned from the discrete open configuration 1 to second discrete open configuration 2, the flow permitted by flow adjustment ports 116a and 116b is aggregated. Similarly, if the valve member 114 were transitioned to the discrete open configuration 5 (see FIG. 6), all of flow adjustment ports 116a-e would be open and in the fluid flow path 108.

As illustrated by the chart of FIG. 7, each additional flow adjustment port 116b-116e adds an additional 1,000 BTU flow rate for the contemplated example. However, other flow rate configurations can be implemented. Thus, under prior art systems, the gas valve 100 would only be able to provide five different discrete flow rates without any ability to provide variability between the five discrete flow rates.

The valve 100 also includes a stepper motor arrangement 126 for driving the valve member 114. The stepper motor arrangement 126 in the present embodiment includes a plurality of coils 128a-c that cooperate with a plurality of magnet elements 130a-130c. The magnet elements 130a-c are coupled to the valve stem 124 such that movement of the magnetic elements 130a-c due to programmed energization of the coils 128a-c similarly drives valve member 114. Proper sequencing of activation of the coils 128a-c will adjust the position of the valve member 114 to transition the valve 100 between the plurality of different discrete open configurations to adjust the permitted flow rate through the valve 100. Such standard control of the valve member 114 is further described and illustrated in U.S. patent application Ser. No. 11/507,107 entitled "Variable Flow Valve," filed Aug. 21, 2006, and having U.S. Pat. Publ. No. 2006/0278285, which is incorporated herein in its entirety by reference thereto.

Preferably, the stepper motor arrangement 126 is configured such that the valve member 114 can be maintained in various fixed positions relating to the various discrete open configurations provided by the gas valve 100.

Controller 132 operatively couples to the flow adjustment arrangement 110 to switch the flow adjustment arrangement between the discrete open configurations. The controller 132 may include a microprocessor. Typically, controller 132 will have a selector arrangement 134 to allow the user, typically a cook, to select the desired flow rate. The selector arrangement 134 could be in the form of a dial, a digital representation of a dial, a capacitive touch arrangement, etc. Typically, the cook will select a desired temperature which has been correlated to a desired gas flow rate that will generate the desired temperature at a connected burner. This desired temperature may be illustrated in selector arrangement 134 by ranges such as "high", "medium" or "low"; alternatively the temperature may be illustrated merely as "1"; "2"; "3"; "4"; and "5" (as illustrated in FIG. 1); further yet actual temperature readings could be used, such as using a digital readout display. While selector arrangement 134 is illustrated as a dial, the selector arrangement could be completely electronic and use a digital display.

The controller 132 operatively controls the flow adjustment arrangement 110 and particularly positioning of the valve member 114 according to the selector arrangement 134.

To control the flow adjustment arrangement 110, controller 132 is operatively coupled to stepper motor 126 and controls energization of coils 128a-c to effectuate desired positioning of the valve member 114.

Unlike prior controllers and control methods for controlling the position of valve member 114, controller 132 is configured to cyclically alternate the flow adjustment arrangement 110 between different ones of the discrete open configurations. This cycling between different ones of the discrete open configurations provides the user with the ability to infinitely adjust the flow rate permitted by the gas valve 100 between the flow rates established by the different ones of the discrete open configurations. As the flow adjustment arrangement 110 cyclically alternates back and forth between the different ones of the discrete configurations, an average flow rate through the gas valve 100 will be created that is typically different than either flow rate provided by the different ones of the discrete open configurations.

For example, if a user, such as cook, desires a burner temperature than that is between the temperature associated with flow rates established by discrete open configurations 1 and 2, with the present invention, the user can infinitely adjust the burner temperature by adjusting a selector position between the first and second configuration settings.

Figure 3:
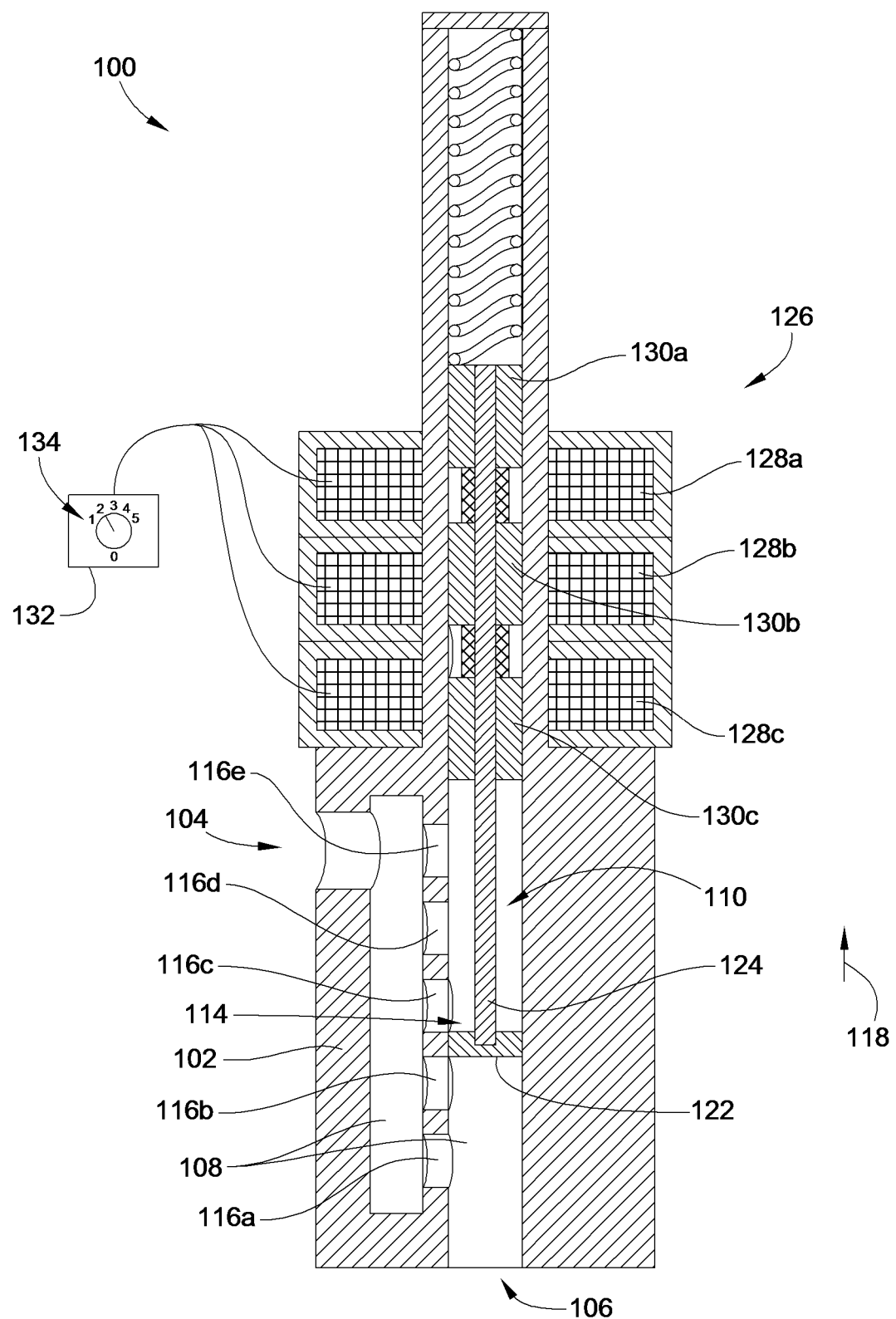
Figure 4:
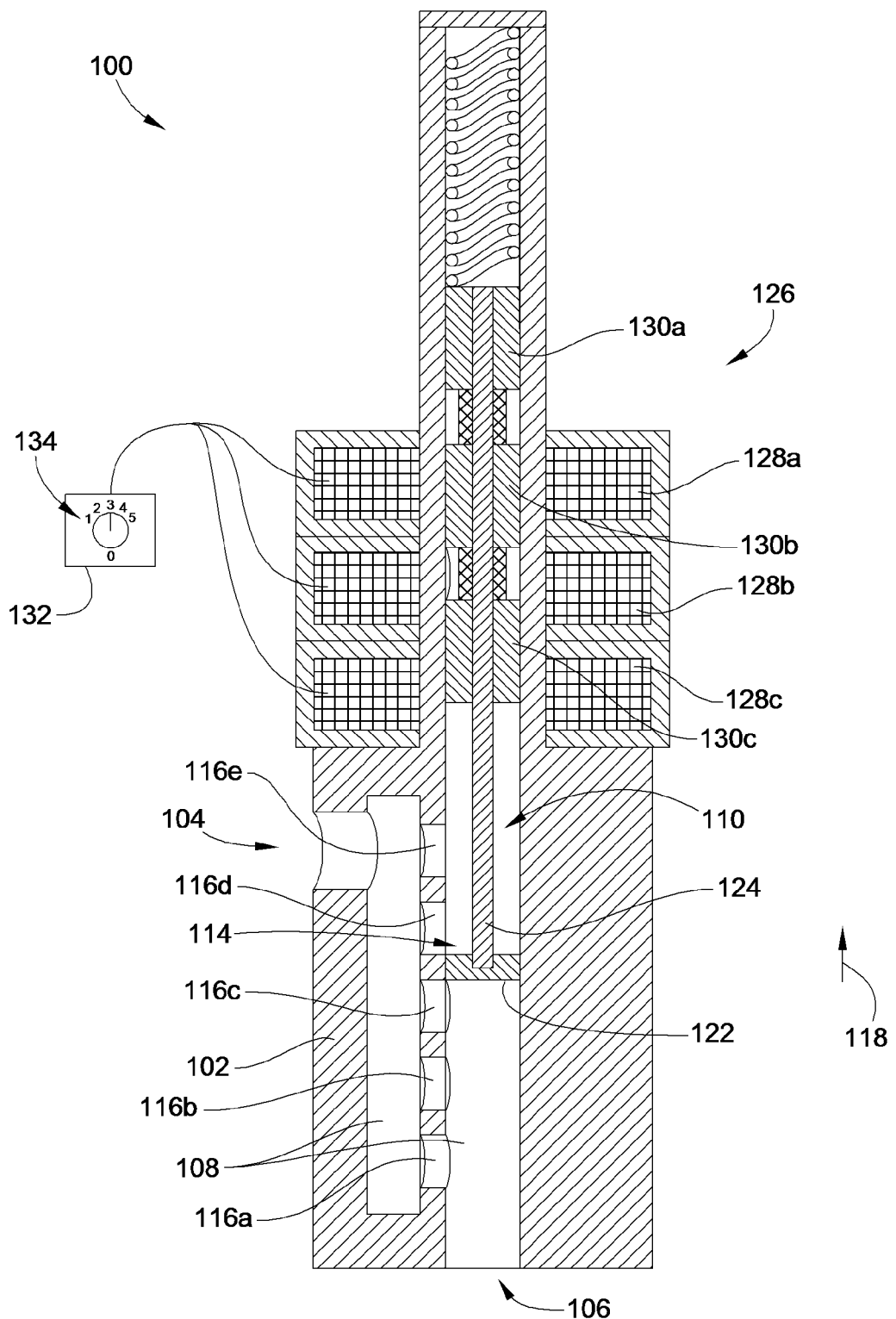
Figure 5:
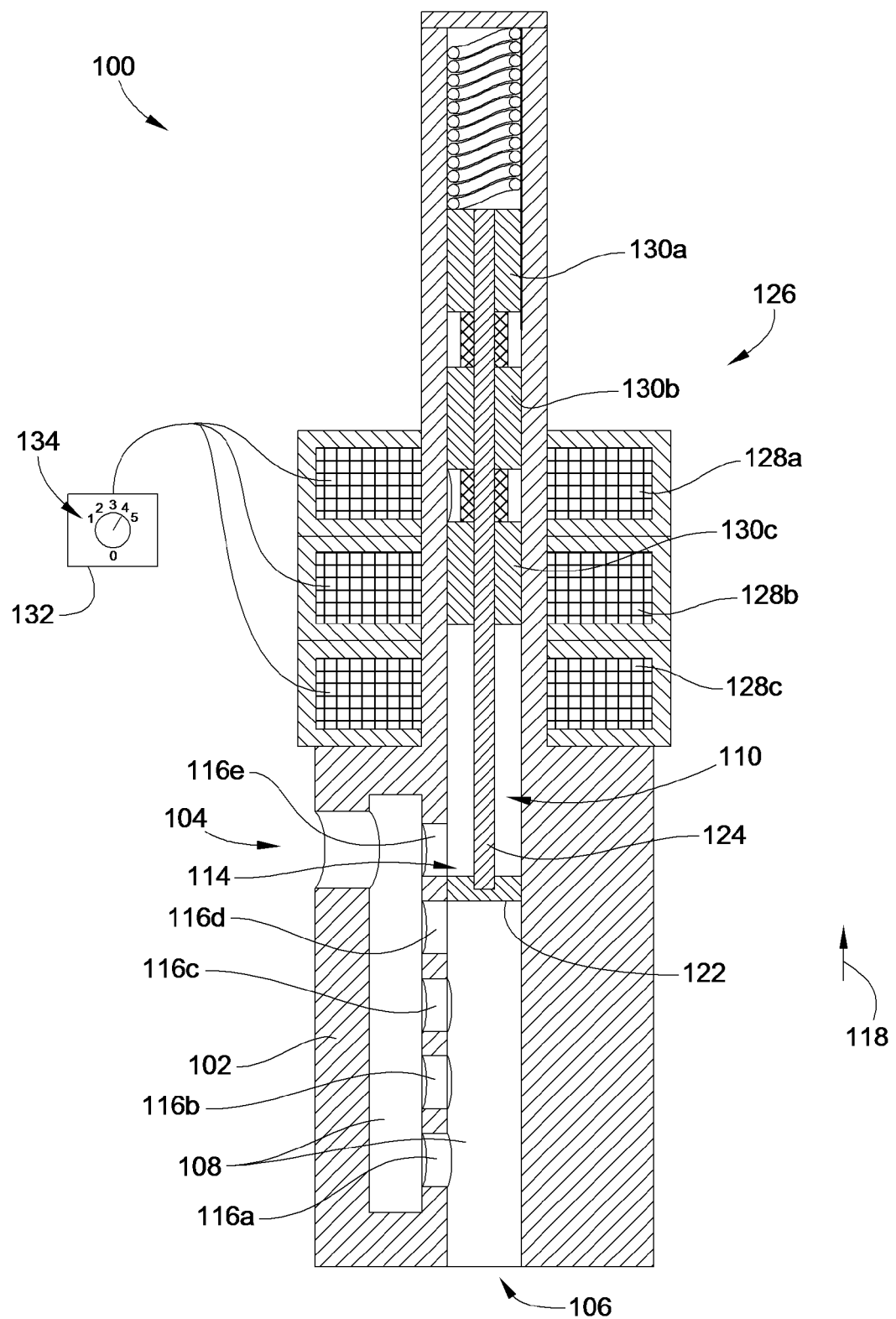
Figure 8:
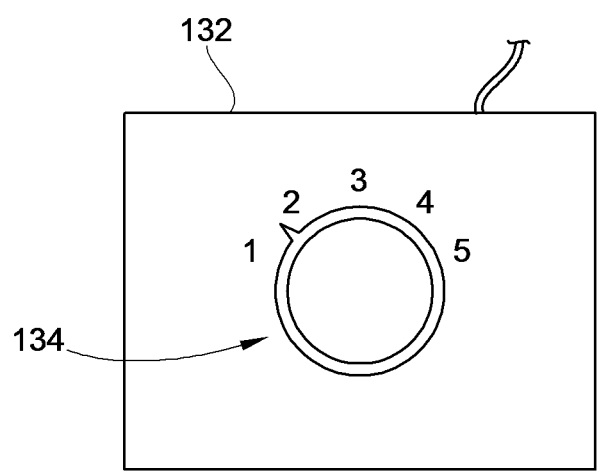
FIG. 8 is an enlarged simplified illustration of a selector arrangement of the controller of the gas control valve of FIG. 1.

As illustrated in FIG. 8, the user has desired a temperature that is 75% of the way between discrete open configuration 1 and discrete open configuration 2. When such a setting is selected, i.e. between two of the discrete open configurations, the controller 132 will control the stepper motor 126 to cyclically oscillate valve member 114 between the two discrete open configurations that bound the desired setting to provide the desired average flow rate. Thus, in the instant example, the controller 132 will cause the valve member 114 to cyclically oscillate between discrete open configuration 1 (FIG. 2) and discrete open configuration 2 (FIG. 3).

With reference to FIG. 7, if the valve member 114 remained in discrete open configuration 1 the valve would permit a flow rate of 12,000 BTU, alternatively if the valve member 114 remained in discrete open configuration 2, the valve 100 would provide a flow rate of 13,000 BTU. However, by selecting between these two positions, the cook desires a temperature that correlates to an average output flow rate of 12,750 BTU.

Because the desired setting is not equally positioned between the two bounding discrete open configurations, the controller 132 must similarly adjust the residence time at each of the two bounding discrete open configurations to provide for an average flow rate that is equivalent to the desired setting.

Figure 9:
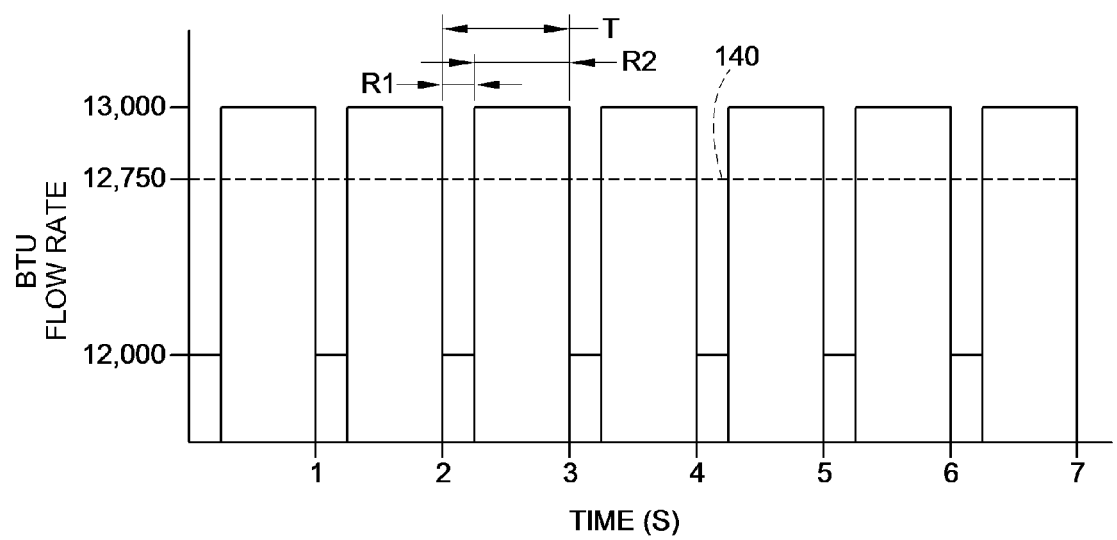
FIG. 9 is a graph of the actual flow rate and average resulting flow rate when the selector arrangement is positioned between two discrete open configuration indicators, as illustrated in FIG. 8.

FIG. 9 is a hypothetical chart illustrating the control sequence provided by controller 132 to generate the desired average flow rate of 12,750 BTU. Using a hypothetical period T for each cycle of 1 second, the valve will spend 75% of the cycle at discrete open configuration 2 and 25% of the cycle at discrete open configuration 1 to provide an average flow rate of 12,750 BTU. Thus, for the 1 second period T, the controller 132 will maintain the gas valve 100 in discrete open configuration 1 for a residence time R1 of 0.25 seconds and in discrete open configuration 2 for a residence time of R2 for 0.75 seconds. Thus, the average flow rate (illustrated by dashed line 140 in FIG. 9) is generated by 25% of 12,000 BTU flow rate provided by discrete open configuration 1 plus 75% of 13,000 BTU flow rate provided by discrete open configuration 2. In theory, the average flow rate provided by the valve will fluctuate between the two different rates due the cyclical pulsing of the two different flow rates, but due to resistance and lag time within the system, it is generally contemplated that a smoothing effect will occur to prevent significant fluctuations in operation of downstream devices such as a burner of a stove or oven.

Thus, to adjust the average flow rate of the gas valve 100 between two bounding discrete open configurations, the controller 132 adjusts the ration of residence times R1 to R2. Typically, it is desired to keep the period T constant and inversely adjust residence times R1 and R2. However, alternative embodiments can also adjust period T when changing from one average flow rate to a different average flow rate. For example, R1 could remain the same while R2 increases to adjust the average flow rate.

Further, residence times R1 and R2 are inversely proportional to the distance of the selector indicator away from the two bounding discrete open configuration indicators. Thus, the farther the indicator is away from, for example, the discrete open configuration 1 indicator (i.e. the "1" in FIG. 8) and closer to the discrete open configuration 2 indicator (i.e. the "2" in FIG. 8) the shorter residence time R1 will be. Similarly, the farther the indicator is away from, for example, the discrete open configuration 2 indicator (i.e. the "2" in FIG. 8) and closer to the discrete open configuration 1 indicator (i.e. the "1" in FIG. 8) the shorter residence time R2 will be.

As used herein "distance" can merely be a digital representation or simulation of the selector arrangement of FIG. 8. For example, FIG. 10 selector position 1.1 would be a digital representation of a distance of 0.1 away from discrete open configuration 1 indicator (i.e. the "1"). Selector position 1.1 is close to the selector position "1" (i.e. only 0.1) while the 1.1 is correspondingly far from selector position "2" (i.e. 0.9).

Figure 10:
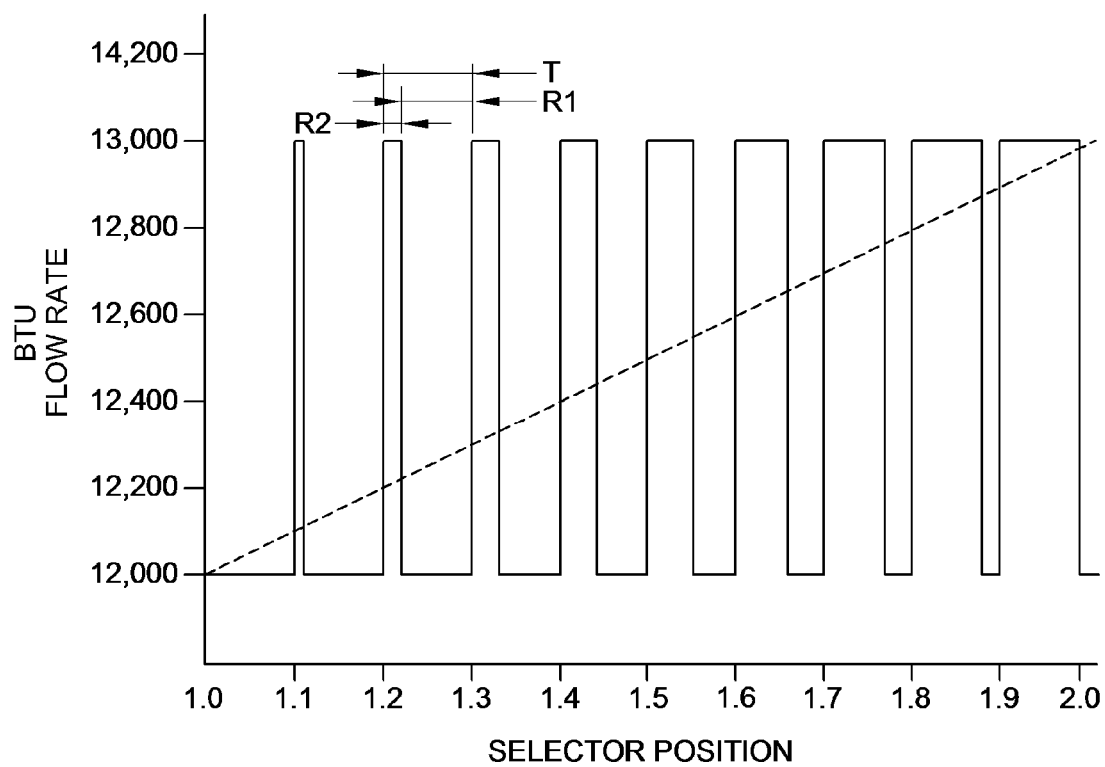
FIG. 10 is a graph of various residence times depending on different selector arrangement positions between discrete open configuration 1 and discrete open configuration 2 and the resultant average temperature.

FIG. 10 is a graph illustrating theoretical relative residence times at different predetermined selector positions between selector position 1 and selector position 2. Further, this cyclical operation between two bounding discrete open configurations can be generally viewed as a modified form of pulse-width-modulation.

It should be noted that when the user selects one of the discrete open configurations, e.g. discrete open configuration 2, the controller 132 does not oscillate the valve between different ones of the discrete open configurations. In this selector position, the valve operates like a normal valve that does not include the optional infinite variability provided by the present invention.

Figure 11:
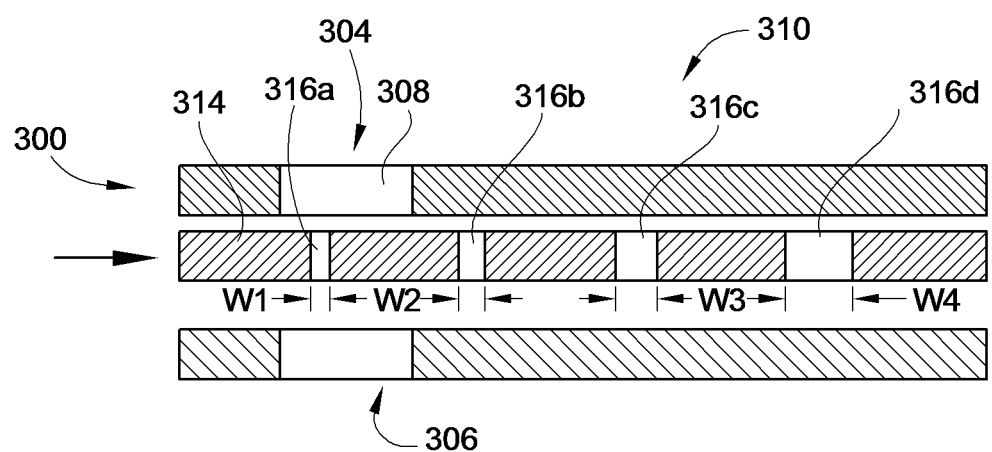
FIGS. 11 and 12 illustrate a further embodiment of a flow adjustment arrangement for use in gas control valves according to the teachings of the present invention.
Figure 12:
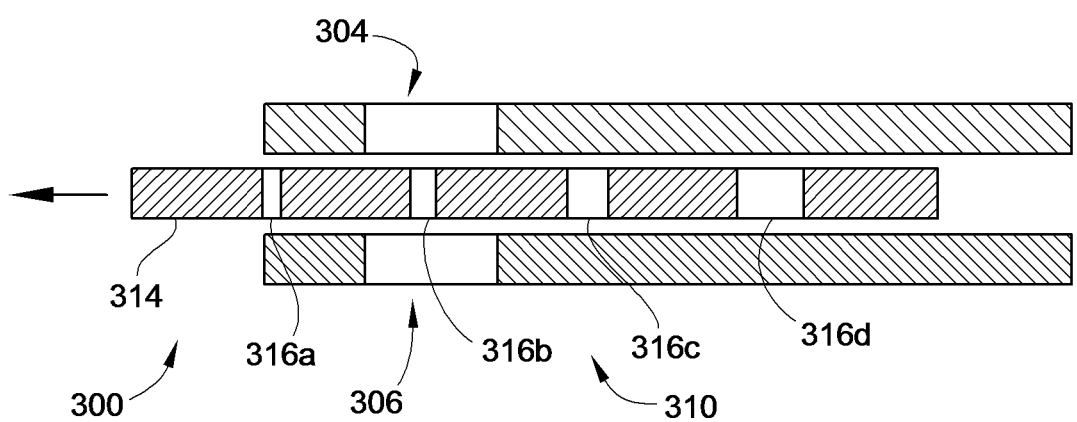

FIGS. 11 and 12 are simplified schematic representations of an alternative embodiment of a gas valve 300 and particularly the flow adjustment arrangement 310 of a gas valve 300 establishing discrete open configurations. In this embodiment, there is no aggregation or subtraction of flow adjustment ports by the valve member to switch from one discrete open configuration to the next. Instead, each discrete open configuration is assigned its own flow adjustment port 316a-d in valve member 314. Each port 316a-d has a varying area illustrated in FIGS. 11 and 12 as varying widths W1, W2, W3 and W4. The varying areas adjust the size of fluid flow path 308 extending from inlet port 304 to outlet port 306. Again, the valve member 314 can be driven by a linear stepper motor arrangement (not shown) to drive the valve member 314 cyclically between the various discrete open configurations.

Further methods of controlling the flow of fluid through the gas valves can be incorporated.

With reference to the schematic representation of the gas valve 300 in FIGS. 11 and 12, the valve member 314 could transition into an "off configuration" wherein fluid flow through the gas valve 300, and particularly fluid flow path 308, is prevented. More particularly, if the spacing between adjacent ones of flow adjustment ports 316a-d is greater than the width of inlet port 304 and/or outlet port 306, flow will be blocked by the section of the valve member 314 between the adjacent flow adjustment ports 316a-d.

In some implementations of the cycling of the valve member 314, the sequence may include a stop at the "off configuration." However, in doing so, average flow through the valve 300 will be maintained at a level to maintain ignition of an attached device and prevent a flame from being extinguished. Thus, in one implementation, the sequence could include cycling between discrete open configurations 1 and 2 (flow adjustment ports 316a and 316b, respectively) while including a period of the cycle at the off configuration between discrete open configurations 1 and 2. However, the time period in the off configuration will significantly short to prevent the average flow through the gas valve 300 from allowing the attached device to be extinguished.

In alternative implementations, the cycling may alternate between an off configuration and a single discrete open configuration. By cycling between the discrete open configuration and an off configuration, the average flow rate through the gas valve 300 will be reduced from the full flow rate permitted by the selected discrete open configuration.

Some valves may be configured to perform multiple types of cycling. For instance, when the user desires to have a flow rate that is very close to one of the flow rates provided by one of the discrete open configurations, the controller may use cycling where the valve member 314 merely oscillates between that discrete open configuration and an adjacent off configuration. This may be the case when the stepper motor other actuation device of the valve cannot react fast enough to oscillate between two separate discrete open configurations.

However, when the user desires to have a flow rate that is more equally spaced between those that are provided by two of the discrete open configurations, the controller may oscillate back and forth between the two discrete open configurations or use the hybrid method that oscillates between the two discrete open configurations and an off configuration. This arrangement may be useful to prevent pressure spikes or significant fluctuations in the actual flow through the gas valve by maintaining the gas valve in an open configuration (i.e. either one of the bounding discrete open configurations) more than a closed configuration.

In many situations, it is desired to quickly heat an object but to then maintain it at a lower temperature, such as pan on a stove when working with food items such as chocolate. If a user directly sets the desired temperature as the lower working temperature, it will take an extended period of time to get the pan to the desired temperature. Therefore, in one embodiment of the invention, with reference to FIGS. 1-6 and 8, the controller 132 can be configured to provide a warm up sequence where the controller 132 initially ramps up the gas flow through valve 100 beyond the flow rate designated by the selector arrangement 134.

More particularly, the user may select the position illustrated in FIG. 8, which as indicated previously can be provided by oscillating the valve member 114 between discrete open configurations 1 and 2. However, prior to the pan actually reaching the desired temperature, the controller 132 can be configured to fully open valve 100 such that the valve member 114 is in, for example, discrete open configuration 5 as illustrated in FIG. 6.

The controller can maintain the valve in the fully open configuration, i.e. discrete open configuration 5, for a length of time. This time could be pre-programmed into the controller 132 based on the desired ultimate flow rate setting identified by the selector arrangement 134 or alternatively could be established by a signal from a temperature sensor that senses that the temperature is approaching the desired temperature identified by selector arrangement 134.

Once the object (pan) being heated by a burner connected to valve 100 approaches the temperature provided by the selector arrangement position illustrated in FIG. 8, the controller 132 can begin to close down the valve 100, i.e. reduce the average flow through valve 100, by transitioning the valve member 114 towards discrete open configurations 1 and 2. Thereafter, the controller 132 for continue oscillating the position of the valve member 114 to maintain the desired average flow rate required by the selector arrangement 134.

While the previous example initially went to a discrete open configuration having a flow rate that is significantly greater than the bounding discrete open configurations 1 and 2 of the desired average flow rate, other arrangements may merely maintain the valve member in the higher one of the two discrete open configurations for a period of time prior to beginning oscillating between the discrete open configurations bounding the desired average flow rate.

While not shown, one of ordinary skill in the art will recognize that other flow adjustment arrangements can be utilized to establish the discrete open configurations. For example, a rotary arrangement could be implemented using a rotary stepper motor such as illustrated in U.S. Pat. Publ. No. 2006/0278285.

Thus, any gas valve that was otherwise restricted to discrete open configurations could also be infinitely adjustable utilizing a controller configured according to embodiments of the present invention. Such restrictions could merely be provided based on the positioning means of the valve member. For example, the use of a stepper motor that provides for only incremental adjustment in position of an operatively coupled valve member could allow such a valve to be made infinitely adjustable by incorporating teachings of the present invention.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A gas control valve comprising:
a housing having an inlet port and an outlet port;
a fluid flow path between the inlet port and the outlet port;
a flow adjustment arrangement within the fluid flow path having a plurality of discrete open configurations, each of the plurality of discrete open configurations establishing a different unique flow rate through the fluid flow path;
a controller operatively coupled to the flow adjustment arrangement to switch the flow adjustment arrangement between the discrete open configurations, the controller cyclically alternating the flow adjustment arrangement between different ones of the discrete open configurations providing an average flow rate through the fluid flow path that is between the unique flow rates permitted by the different ones of the discrete open configurations;
further including a selector for establishing a user defined flow rate, the selector including a discrete open configuration indicator for each one of the plurality of discrete open configurations, the selector positionable at or between the discrete open configuration indicators;
wherein when the selector aligns with one of the discrete open configuration indicators, the controller maintains the flow adjustment arrangement in the discrete open configuration, when the selector is aligned in a stationary position between two discrete open configurations, the controller cyclically alternates the flow adjustment arrangement between the two discrete open configurations;
wherein when the selector is aligned between two discrete open configuration indicators, the controller establishes a residence time for each of the two discrete open configurations that the selector is between, the spacing between the selector and the discrete open configuration indicators being inversely proportional to the residence time for the corresponding discrete open configuration; and
wherein the selector is digital and the distance is a digital representation of a distance.

2. A gas control valve comprising:
a housing having an inlet port and an outlet port;
a fluid flow path between the inlet port and the outlet port;
a flow adjustment arrangement within the fluid flow path having a plurality of discrete open configurations, each of the plurality of discrete open configurations establishing a different unique flow rate through the fluid flow path;
a controller operatively coupled to the flow adjustment arrangement to switch the flow adjustment arrangement between the discrete open configurations, the controller cyclically alternating the flow adjustment arrangement between different ones of the discrete open configurations providing an average flow rate through the fluid flow path that is between the unique flow rates permitted by the different ones of the discrete open configurations;
further including a selector for establishing a user defined flow rate, the selector including a discrete open configuration indicator for each one of the plurality of discrete open configurations, the selector positionable at or between the discrete open configuration indicators;
wherein when the selector aligns with one of the discrete open configuration indicators, the controller maintains the flow adjustment arrangement in the discrete open configuration, when the selector is aligned in a stationary position between two discrete open configurations, the controller cyclically alternates the flow adjustment arrangement between the two discrete open configurations;
wherein when the selector is aligned between two discrete open configuration indicators, the controller establishes a residence time for each of the two discrete open configurations that the selector is between, the spacing between the selector and the discrete open configuration indicators being inversely proportional to the residence time for the corresponding discrete open configuration; and
wherein the controller maintains a constant period for any value between two discrete open configurations but only adjusts the ration of the residence times for the two discrete open configurations to adjust the average flow rate permitted by the valve.

* * * * *